United States Patent Office 3,192,088
Patented June 29, 1965

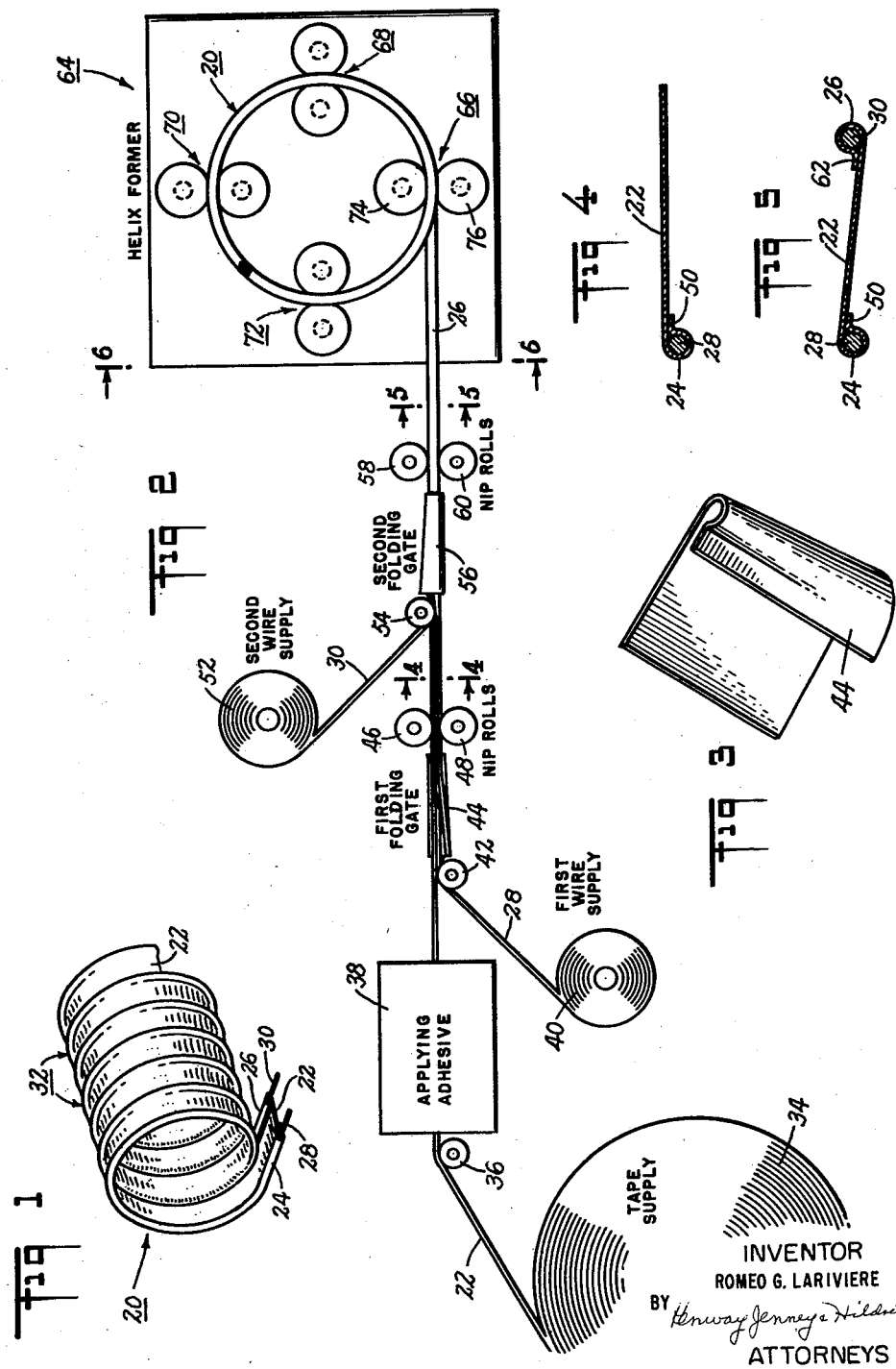

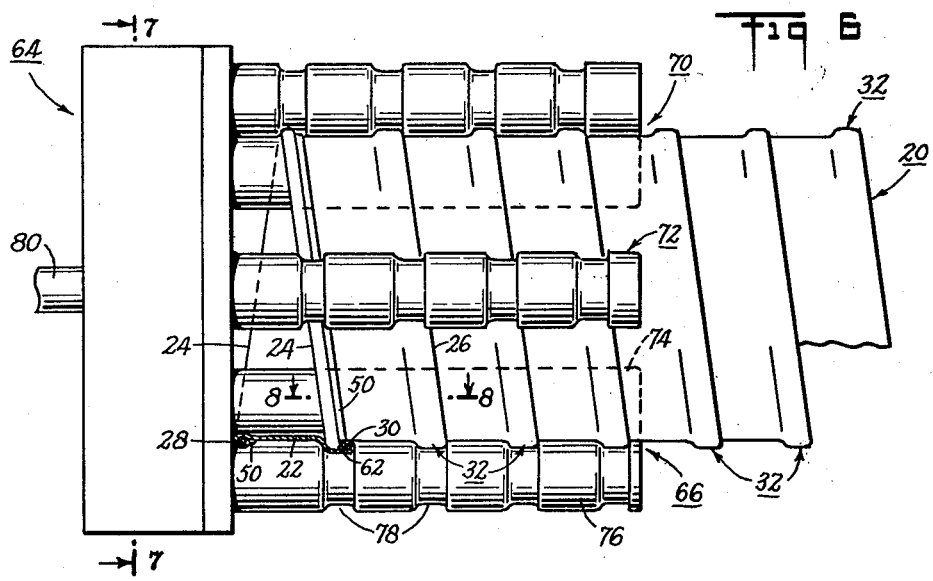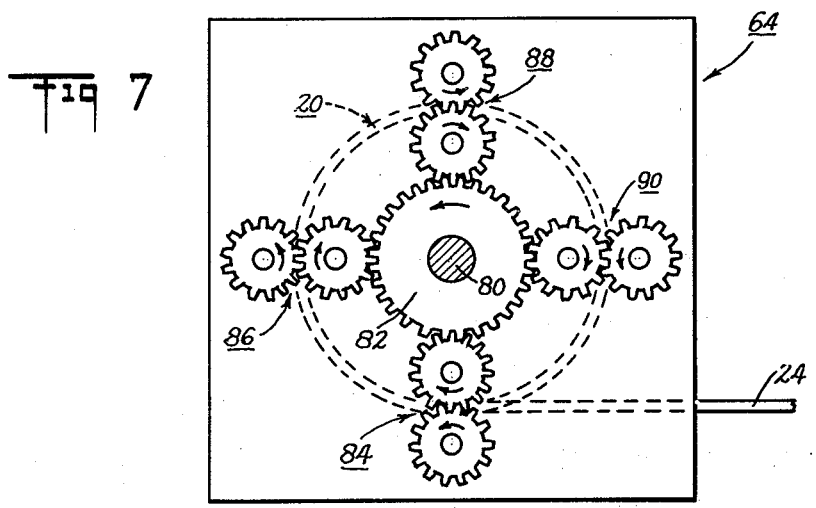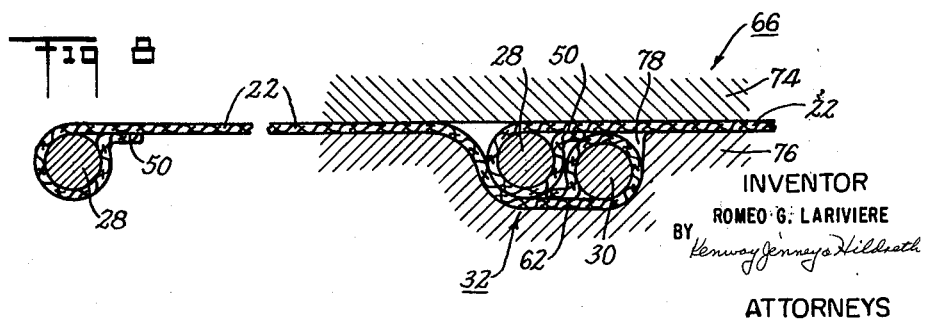

3,192,088
METHOD AND APPARATUS FOR CONTINUOUSLY FORMING REINFORCED FLEXIBLE HOSE
Romeo G. Lariviere, Amesbury, Mass., assignor to Callahan Mining Corporation, New York, N.Y., a corporation of Arizona
Filed May 6, 1963, Ser. No. 278,370
13 Claims. (Cl. 156—143)

This invention relates to a method and apparatus for continuously forming flexible hose from adhesive-coated tape by winding such tape in a helix while overlapping its edges. More particularly, the present invention contemplates a novel method and apparatus for making an improved form of wire-reinforced flexible hose of the type disclosed in United States Patent No. 2,674,298 issued to R. G. Bringolf on April 6, 1954. The improved flexible hose is described in the co-pending application of Charles H. Smart, Serial No. 278,369 filed May 6, 1963, entitled "Flexible Hose."

The tape from which the flexible hose of the type disclosed in the Bringolf patent is formed is continuous, ribbon like, flexible, and adhesive and is reinforced with wire along one edge. The flexible hose made from this tape comprises a series of helical overlapping loops held together by the adhesive character of the tape. Apparatus for making this hose is disclosed in the Bringolf patent. This apparatus includes a pair of forming rollers, at least one of which includes spaced annular grooves. One end of the rollers are supported in cantilever bearings, and the other ends are free. The wire reinforced tape is fed between the nip of the rollers, looped back so that the end of the tape is re-fed through the rollers to overlap the edge of the tape entering the machine. The forming rollers exert pressure on the overlapping edges of the tape causing them to adhere to each other. Thus, when the rollers are continuously driven, a helical-form continuous hose is generated and feeds along parallel to the axes of the rollers.

It is an object of the present invention to provide a method for forming helical-form hose of the type described in the above identified Smart application.

Another object of the invention is to provide a continuous method of the above character.

A further object of the invention is to provide a method of the above character which requires relatively simple apparatus to carry out the method.

Yet another object of the invention is to provide apparatus for carrying out the method of the above character.

A still further object of the invention is to modify methods and apparatus of the prior art whereby they are adapted for forming helical-form hose of the type described in the above identified Smart application.

Other objects of the invention will in part be obvious and will in part appear hereinafter.

The invention accordingly comprises the several steps and the relation of one or more of such steps with respect to the others, apparatus embodying features of construction, combinations of elements and arrangements of parts which are adapted to perform such steps, all as exemplified in the detailed disclosure hereinafter set forth, and the scope of the invention will be indicated in the claims.

For a fuller understanding of the nature and objects of the invention, reference should be had to the following detailed description taken in connection with the accompanying drawings, in which:

FIGURE 1 is a perspective view of a section of helical-form flexible hose according to the above identified Smart application.

FIGURE 2 is a side view of apparatus according to the preferred embodiment of the present invention for continuously forming the flexible hose of FIGURE 1;

FIGURE 3 is a perspective view of a portion of the apparatus shown in FIGURE 2;

FIGURE 4 is a cross sectional view taken along the line 4—4 of FIGURE 2;

FIGURE 5 is a cross sectional view taken along the line 5—5 of FIGURE 2;

FIGURE 6 is a partial cross sectional view taken along the line 6—6 of FIGURE 2;

FIGURE 7 is a partial cross sectional view taken along the line 7—7 of FIGURE 6; and FIGURE 8 is a cross sectional view taken along the line 8—8 of FIGURE 6.

The same reference characters refer to the same parts throughout the several views of the drawings.

The method of the present invention for manufacturing helical-form flexible hose generally comprises reinforcing the tape from which the hose is manufactured along both of its edges with wire in the same manner one edge of the tape is reinforced according to the prior art, as illustrated in the Bringolf patent. The tape is then formed into a helix with its edges overlapping and the two reinforcing wires interlocking to form a strong flexible joint. The edges of the tape are preferably also adhered together during the forming operation.

Thus, the flexible hose formed by the method and apparatus of the present invention has closely adjacent interlocked reinforcement wires along the two edges of the tape from which the hose is formed. Preferably the tape is wrapped around the reinforcement wires in the same direction so that the edges of the tape are concealed within the seam of the hose.

The apparatus of the present invention therefore generally comprises a pair of folding gates for folding each edge of an adhesive tape about a stiffening member such as a reinforcing wire and a device for then forming the tape into a helix so that its wire reinforced edges overlap, interlock and adhere together. The helix former preferably comprises a plurality of identical pairs of forming rollers spaced at equal angles about the surface of the hose being formed thereon.

More specifically, referring to FIGURE 1, the flexible hose 20 of the above identified Smart application is formed of an elongated helically wound flexible tape 22. The edges 24 and 26 of the tape 22 are reinforced with wires 28 and 30 respectively. When the tape 22 is helically wound, the leading edge 26 of each tape helix overlaps with the trailing edge 24 of each next adjacent tape helix so that the two helixes formed of wires 28 and 30 are adjacent and interlock at the helical seam, generally indicated at 32.

The interlocked wires 28 and 30 form an extremely flexible strong seam 32. The interlocked wires strongly resist forces tending to pull apart the seam 32. The cross sectional area of teh reinforcing wires 28 and 30 are preferably chosen to be each one half that of the single wire used for hose of the same specifications of the prior art. Thus this more flexible hose has at least the same resistance to crushing as that of the prior art. Furthermore, since the two wires 28 and 30 have a smaller diameter than the equivalent single wire of the prior art, the thickness of the wall of the hose 20 at the seam 32 is smaller than that of the prior art. Thus, for a given inside diameter requirement, the hose 20 will have a smaller outside diameter than equivalent hose of the prior art.

The tape 22 may be of any flexible strong material used in the prior art such as a neoprene coated nylon fabric or the like. Preferably the abutting edges of the tape 22 at the seam 32 are adhered together so that no movement is possible between the adjacent turns of the tape 22 at seam 32.

Referring to FIGURE 2, the hose 20 is manufactured according to the preferred embodiment of the present invention in the following manner. The tape 22 is supplied from a large tape supply reel 34. The tape passes over guide roller 36 into conventional adhesive applying apparatus 38 where adhesive is applied to both sides of both edges of the tape 22 for reasons that will be apparent from further discussion of the apparatus of FIGURE 2.

Wire 28 is drawn from a first wire supply 40 around guide roller 42 into juxtaposition with tape 22. The tape 22 and wire 28 then pass through a first folding gate 44 where the edge 24 of the tape is folded about wire 28.

FIGURE 3 is a perspective view of folding gate 44, which is of conventional design.

After passing through folding gate 44 the tape 22 and wire 28 pass through a pair of rollers or nippers 46 and 48 which resiliently press the overlapped portions 50 of the tape together (FIGURE 4) so that they adhere.

Wire 30, supplied from a second wire supply 52, passes over guide roller 54 into juxtaposition with the tape 22. Wire 30 and tape 22 then pass through a second folding gate 56 identical to the first folding gate 44 so that the edge 26 of the tape 22 is rolled about wire 30 in the manner shown in FIGURE 5. The tape 22 and wire 30 then pass through nippers 58 and 60 similar to nippers 46 and 48 which compress the adjacent portions of the tape 62 (FIGURE 5) together so that they adhere. As seen in FIGURE 5, the edges 24 and 26 of the tape 22 are folded about the wires 28 and 30 in opposite directions such that the resulting tape cross-section resembles the letter "S."

If desired the first and second folding gates 44 and 56 might be juxtaposed so that the edges 24 and 26 of the tape 22 would be folded about wires 28 and 30 simultaneously.

The tape 22 together with the reinforcing wires 28 and 30 is then passed into a helix former generally indicated at 64.

Helix former 64 comprises four pairs of forming rollers 66, 68, 70 and 72 spaced at 90 degree angles about the circumference of the hose 20 being formed. The wire reinforced tape 22 is first fed to the nip of forming rollers 66 then to the nips of rollers 68, rollers 70, and rollers 72 and then again to the nip of rollers 66 where the trailing and leading edges 24 and 26 of the tape 22 overlap and the wires 28 and 30 interlock to form hose 20 as shown in FIGURE 1. Now referring to FIGURES 6 and 8, the first forming rollers 66 comprise a smooth cylindrical inner-roller 74 and a generally cylindrical outer roller 76. Outer roller 76 has a plurality of identical annular grooves 78.

As best seen in FIGURE 8, the rollers 74 and 76 have a clearance between them substantially equal to the thickness of the tape 22, and the grooves 78 in the roller 76 have a depth measured from the surface of roller 74 approximately equal to the diameter of wires 28 and 30 plus the thickness of three additional layers of the tape 22. If the overlap portions 50 and 62 are extended in length however, the distance between the base of groove 78 and the facing roller surface is approximately equal to the diameter of the wires plus four tape thicknesses. The inner rollers of the other sets of rollers 68, 70 and 72 are also smooth and the outer rollers grooved as is roller 76. Thus, the rollers 66, 68, 70 and 72 are adapted to squeeze the seam 32 and the grooves therein exert a camming action due to their sloping sidewalls to squeeze wires 28 and 30 together to cause all adjacent portions of seam 32 to adhere together.

Again referring to FIGURE 6, the grooves 78 are spaced apart a distance equal to the pitch of the helix of the hose 20 being formed. The grooves in outer rollers of the other sets of forming rollers 68, 70 and 72 are all spaced apart a distance equal to the pitch of the helix of the hose 20 being formed, and are also axially displaced or offset successively from each other by one quarter of this distance, so as to accept the seam 32 and guide it in a helix as the hose 20 is formed.

The four sets of forming rollers 66, 68, 70 and 72 are preferably driven by a single drive shaft 80 connected to a prime mover (not shown).

Now referring to FIGURE 7, drive shaft 80 drives a synchronizing drive gear 82 in a counterclockwise direction as shown in FIGURE 7. Drive gear 82 drives four pairs of equal diameter gears 84, 86, 88 and 90 mounted on the ends of the pairs of forming rollers 66, 68, 70 and 72 respectively. Thus, the forming rollers are all driven at the same speed.

Apparatus of the type disclosed in United States Patent No. 2,759,521 issued to J. T. Hall et al., on August 21, 1956, may be modified according to the present invention by shaping the grooves in the forming rollers disclosed therein as shown in FIGURE 8 hereof. If desired, both rollers of each pair of forming rollers 66, 68, 70 and 72 herein (FIGURE 8) may be grooved as are the forming rollers of the Hall patent. It is also contemplated that the tape 22 could be folded about the wires 28 and 30 so that the overlapped portions 50 and 62 are on the same side of the tape rather than on opposite sides, as shown in FIGURE 5.

It will thus be seen that the objects set forth above, among those made apparent from the preceding description, are efficiently attained, and since certain changes may be made in carrying out the above process and in the construction set forth without departing from the scope of the invention, it is intended that all matter contained in the above descripion or shown in the accompanying drawings should be interpreted as illustrative and not in a limiting sense.

It is also to be understood that the following claims are intended to cover all of the generic and specific features of the invention herein described and all statements of the scope of the invention, which as a matter of language, might be said to fall therebetween.

Having described my invention, what I claim as new and desire to secure by Letters Patent is:

1. The method of continuously forming flexible hose comprising the steps of:
(A) folding the leading and trailing lateral edges of a moving flexible tape about moving elongated stiffening members; and
(B) helically winding the tape with the leading folded edge of one tape helix overlapping the trailing folded edge of the next adjacent tape helix and with the stiffening members interlocking adjacent tape helixes together.

2. The method of continuously forming a flexible hose comprising the steps of:
(A) folding the leading and trailing lateral edges of a moving flexible tape in the form of a U about moving stiffening members;
(B) winding the tape into helixes with the leading and trailing folded edges of adjacent tape helixes overlapped and stiffening members of adjacent tape helixes overlappingly interlocked, the tape helixes having a substantially common pitch, diameter and axis; and,
(C) adhering the overlapping lateral edge surfaces of the tape together.

3. The method defined in claim 2 wherein the tape is folded about the two stiffening members in the form of an S.

4. The method of continuously forming flexible hose comprising the steps of:
(A) applying adhesive to both sides of a moving flexible tape adjacent to the leading and trailing lateral edges thereof;
(B) folding the leading edge of the tape about a first elongated stiffening member moving at substantially the same speed and in substantially the same direction as the flexible tape;
(C) folding the trailing edge of the tape about a second stiffening member moving at substantially the same speed and in substantially the same direction as the flexible tape; and
(D) guiding the stiffened tape into a helical path to overlap the leading folded edge of one tape helix with trailing folded edge of the next adjacent tape helix and to interlock the first stiffening member of said one tape helix with the second stiffening member of said next adjacent tape helix.

5. The method defined in claim 4 wherein the leading and trailing edges of the tape are folded about the first and second stiffening members in the form of an S.

6. Apparatus for continuously forming flexible hose comprising in combination:
 (A) means for applying adhesive to a moving flexible tape;
 (B) means for folding each of the edges of the tape about different moving elongated stiffening members; and
 (C) means for continuously forming the moving tape into a helix with the adjacent edges of the tape overlapping and adhering and the stiffening members forming two interlocking helixes of substantially common pitch, diameter and axis.

7. The combination defined in claim 6 wherein said means for continuously forming a helix comprises:
 (D) at least one pair of forming rollers,
  (a) at least one of said forming rollers comprising at least one annular groove wide enough and deep enough to accommodate adjacent overlapped edges of the tape with the reinforcing members in interlocked relation.

8. The combination defined in claim 7 wherein a plurality of pairs of said forming rollers are disposed in a circular arrangement with the grooves thereof axially offset so as to accommodate the overlapped edges of the tape in a progressive helical movement.

9. The combination defined in claim 8 which further includes
 (E) drive means for synchronously driving said drive rollers.

10. Apparatus for continuously forming flexible hose from a length of helically wound, reinforced tape, said tape being reinforced with a first reinforcing element incorporated in one folded over lateral edge portion and a second reinforcing element incorporated in the other folded over lateral edge portion of said tape, said apparatus including, in combination,
 (A) a pair of superimposed open ended forming rolls,
  (1) said reinforced tape being fed between said forming rolls,
 (B) drive means for counter-rotating said forming rolls,
 (C) means positioned relative to said forming rolls for guiding and supporting said reinforced tape in a helical path as said reinforced tape is looped back on itself and re-fed between said forming rolls with adjacent edges of said reinforced tape between said forming rolls in overlapping relation, and
 (D) groove means formed on at least one of said forming rolls to physically accommodate the overlapped edges of said reinforced tape between said forming rolls with said first and second reinforcing elements in interlocking relation in said groove means, whereby upon rotation of said rolls said flexible hose is continuously formed and continuously feeds axially along said rolls and away from the open ends of said rolls.

11. The apparatus defined in claim 10 wherein
 (D) (1) said groove means is a plurality of annular surface grooves formed on at least one of said forming rolls,
  (a) said annular grooves being spaced axially along the surface of said forming rolls to accommodate the overlapping edges of sucessive loops of said reinforced tape as it is helically wound to form said hose.

12. The apparatus defined in claim 11 wherein
 (C) (1) said means guiding and supporting said reinforced tape includes additional pairs of forming rolls positioned in circular arrangement with said reinforced tape passing between the forming rolls of each pair,
  (a) axially spaced annular grooves formed on at least one forming roll of each pair to accommodate the overlapping edges of successive loops of said reinforced tape as it is helically wound to form said hose.

13. The aparatus defined in claim 12 wherein
 (B) (1) said drive means is coupled to drive the pairs of forming rolls in synchronism with the forming rolls of each pair counter-rotated.

References Cited by the Examiner
UNITED STATES PATENTS

| | | | |
|---|---|---|---|
| 2,274,839 | 3/42 | Marick | 138—129 |
| 2,674,298 | 4/54 | Bringolf | 156—143 |
| 2,759,521 | 8/56 | Hall et al. | 156—436 XR |
| 3,143,456 | 8/64 | McGrath et al. | 156—202 |

FOREIGN PATENTS 511,822  6/52  Belgium.

EARL M. BERGERT, *Primary Examiner.*